United States Patent [19]

Mattsson

[11] Patent Number: 5,051,116

[45] Date of Patent: Sep. 24, 1991

[54] METHOD OF REDUCING PRESSURE DROP DURING THE PASSAGE OF A FLUID, AND A HYDRAULIC SYSTEM RESERVOIR FOR CIRCULATION OF A FLUID

[76] Inventor: Karl-Erik Mattsson, Tingsvägen 7, S-141 45, Huddinge, Sweden

[21] Appl. No.: 548,936

[22] PCT Filed: Mar. 3, 1989

[86] PCT No.: PCT/SE89/00098

§ 371 Date: Aug. 2, 1990

§ 102(e) Date: Aug. 2, 1990

[87] PCT Pub. No.: WO89/08783

PCT Pub. Date: Sep. 21, 1989

[30] Foreign Application Priority Data

Mar. 8, 1988 [SE] Sweden ................................ 8800819

[51] Int. Cl.[5] ................................................ B01D 19/00

[52] U.S. Cl. ............................................ 55/52; 55/48; 55/185; 55/201; 55/309; 55/338

[58] Field of Search ........................ 55/36, 48, 52, 159, 55/182, 185, 201, 309, 338, 356, 385.1, 385.3; 210/130, 133, 167, 168, 188

[56] References Cited

U.S. PATENT DOCUMENTS 4,483,697 11/1984 Deysson et al. .................. 55/338 X
4,783,266 11/1988 Titch et al. ..................... 210/130 X

FOREIGN PATENT DOCUMENTS 0014885 3/1982 Japan ...................................... 55/159
0744190 6/1980 U.S.S.R. .................................. 55/36

*Primary Examiner*—Robert Spitzer
*Attorney, Agent, or Firm*—Sughrue, Mion, Zinn, Macpeak and Seas

[57] ABSTRACT

In mobile hydraulic systems there is used a fine-mesh net structure (7) in a reservoir (6) for extracting air from the hydraulic fluid. When the system is started-up under cold-start conditions, a high pressure drop will prevail across the net structure, due to the viscosity of the fluid under such conditions. To overcome the problems associated herewith, a constricted passageway is provided in the net structure or adjacent thereto, such as to effect viscosity-dependent shunting of the fluid. This constricted passageway may have the form of a hole (11). A diffusor (13) may optionally be arranged in the reservoir, to ensure that the fluid will have laminor flow. A constricted passageway (11) of the aforesaid kind may also be provided in or adjacent to the diffusor (13).

12 Claims, 4 Drawing Sheets

METHOD OF REDUCING PRESSURE DROP DURING THE PASSAGE OF A FLUID, AND A HYDRAULIC SYSTEM RESERVOIR FOR CIRCULATION OF A FLUID

FIELD OF INVENTION

The present invention relates to a method of reducing pressure drop in the passage of a fluid across a fine-mesh net structure, for the purpose of extracting gas from the fluid, e.g. when starting-up mobile hydraulic systems, preferably in the case of repeated passage of the fluid through the net structure.

The invention also relates to a reservoir intended for use in fluid-circulating hydraulic-systems and being equipped with an air separator.

Effective separation of air from the working fluid of a hydraulic system will reduce the amount of input energy required by the system and will also improve the precision at which the system operates. In order for air and other forms of gas to be separated effectively from hydraulic systems, it is normally necessary to ensure that the rate of flow through the system reservoirs is so slow as to afford time for the air bubbles, or gas bubbles, to rise to the liquid surface of the reservoirs thereof, which means that large reservoirs are required. However, the space available for the inclusion of reservoirs in such systems is often limited, and consequently it is necessary to solve the problem of air separation in some other manner; this problem is accentuated when the reservoir volume is reduced and the fluid through flow rate increased.

BACKGROUND PRIOR ART

For the purpose of extracting air effectively from fluid which passes through the reservoir of a hydraulic system at elevated rates of flow, it has been proposed to position a fine-mesh net structure between two mutually opposite corners of the reservoir, with the net structure arranged in an inclined position.

The results of trials carried out with the aid of such a net structure have shown that, in addition to flow rate, the ability to separate air effectively from hydraulic fluids is also contingent on the viscosity of the fluid concerned, the angle at which the net structure is inclined and the fineness of the mesh.

Since in the case of closed systems the oil, or hydraulic fluid, will pass through the net structure several times, air separation will approach a final value asymptotically. This final value will be higher with increasing mesh fineness, since the air bubbles are divided in accordance with size.

Consequently, in order to separate air effectively, it is necessary to use a net of vary fine mesh. However, the pressure drop across fine-mesh net structures is higher than in other cases, particularly when cold-starting mobile hydraulic systems, in which a small reservoir is desirable for several reasons. In practice, the high viscous fluid therethrough, a situation which is quite normal with the cold-start of hydraulic systems, will result in problems of such gravity that other solutions must be sought.

Those solutions proposed hitherto, however, have been both expensive and complicated and have not taken into account the fact that a fine-mesh net structure constitutes and effective means for separating gas from a continuously operating hydraulic system, i.e. subsequent to solving cold-start problems.

Solutions hitherto proposed which recommend the use of different types of pressure limiters comprising moveable components can cause cavitation problems and result in unsatisfactory gas separation.

OBJECT OF THE INVENTION

The object of the present invention is to avoid the aforesaid drawbacks and the invention, to this end, is based on the realization that since the fluid circulates in the hydraulic system, it is not necessary to extract all air at one and the same time, i.e. 100% extraction, but that the air can equally as well be extracted successively as the system departs from the abnormal conditions which prevail in the case of cold-starts.

One object of the invention in accordance herewith is to provide a method of the aforesaid kind which will enable a fine-mesh net structure to be used in a reservoir of small volume while avoiding the problems occurring when cold-starting such systems.

Another object is to provide a method of the aforesaid kind which avoids the use of moveable parts and/or complicated construction elements to the greatest possible extent.

SUMMARY OF THE INVENTION

The inventive method, which is effective in eliminating the aforesaid problems, is characterised in its widest aspect, by passing a part of the fluid through a constricted passageway, provided with constriction defining means and located in or adjacent to the net structure, such that shunting of the fluid will be viscosity dependent.

The invention makes shunting of the fluid possible without the use of moveable parts, by utilizing the differences in characteristics of density-dependent throttling and viscous throttling of the fluid flow and by coupling the same in parallel.

A theoretical explanation of the advantages afforded by the invention can be had with the aid of the following mathematical relationship. The pressure drop across a net has a viscous characteristic and can be expressed by the following equations:

$$\Delta P = K \cdot Q \cdot \mu \quad (1)$$

$$\mu = \nu \cdot \rho \quad (2)$$

in which $\Delta P$ = pressure drop

K = a constant which is dependent on the area and geometry of the net

Q = the flow through the net $\mu$ = the dynamic viscosity $\rho$ = the density $\nu$ = the kinetic viscosity.

Density throttling can be achieved with the aid of a sharp-edged hole, which may be located in the actual net structure itself or adjacent thereto, e.g. in the edge region of the net structure.

The drop in pressure experienced across a constricted passageway, or nozzle means, in the form of a sharp-edged hole can be expressed by the following equation:

$$\Delta P = \frac{Q^2 \cdot \rho}{A^2 \cdot \alpha^2 \cdot 2} \quad (3)$$

$$\alpha = f(Re) \quad (4)$$

in which $\Delta P$ = pressure drop $Q$ = flow through the constriction defining means $A$ = constriction defining means area $\alpha$ = through flow index $Re$ = Reynolds number $\rho$ = density It follows from this that in the case of density-dependent throttling $$Q \sim \sqrt{\frac{2 \cdot \Delta P}{\rho}} \quad (5)$$

whereas in the case of viscous throttling $$Q \sim \frac{\Delta P}{\mu}. \quad (6)$$

When the net structure and the constriction defining means according to the invention are connected in parallel, the pressure drop across the net will be equal. Consequently, the flow through the net and the constricted passageway will vary in dependence on the kinematic viscosity. When starting up a cold hydraulic system in the open air, conditions under which the oil will have a high kinematic velocity, the major part of the flow will pass initially through the constriction defining means and will be successively steered to pass through the net as the hydraulic fluid is warmed and its kinematic velocity subsequently decreases.

Consequently, the pressure drop will be lower during the start procedure, since the major part of the fluid will flow through the constriction defining means as opposed to all the fluid passing through the net. When the fluid is warm, after having been in work for some period of time, the major part of the fluid, will pass through the net. Since the fluid will pass repeatedly through the reservoirs, the final asymptomic air-separation value will be approximately equal to the value obtained when passing all of the fluid through the net, without first shunting the fluid through the constriction defining means.

It will be understood from the aforegoing that said part of the fluid can be conducted through a sharp-edged hole which is located in the net structure and which forms the constricted-passageway therein. Alternatively, the fluid may be passed to a constricted passageway located at an edge region of the net structure.

When the hydraulic system includes an number of small reservoirs, as is desired in accordance with the invention, with correspondingly large through-flows of fluid and commensurately high flow rates, it is normally necessary to install a diffusor in the fluid flow path, said diffusor suitably having the form of a perforated plate effective in imparting laminar flow to the fluid prior to its entry into the net passage.

The area of the constricted passageway used in the system will preferably be much larger than the total area of the perforations in the diffusor, and in order to achieve maximum possible efficiency in the flow sequence, the constricted passageway should be positioned so that the flow path between the diffusor and the constricted passageway is the shortest possible.

In this respect it lies within the scope of the invention to place the constricted passageway in the diffusor or adjacent thereto, which will therewith satisfy the aforesaid requirement that the constricted passageway is located "in connection with the net structure".

Thus it also lies within the scope of the invention to locate the constricted passageway in an edge region of the diffusor and/or a constricted passageway in the net structure or in an edge region thereof.

The diffusor and net structure may optionally be positioned immediately adjacent one another, such that a common edge region of both of said components will form means for defining the constricted passageway required by the invention.

Thus, it is essential in this respect that that part of the fluid which is intended to pass through the constricted passageway under cold-start conditions will be led in a direction towards said passageway, and that the diffusor is used to this end. The fact that turbulence may occur in the flow at precisely this position of the system will have no influence on the desired extraction of air from the system, since this extraction is achieved nevertheless during the continued extraction process.

The invention also relates to hydraulic system reservoirs for hydraulic systems in which a fluid is circulated, the characterised features of the reservoirs being set forth in the following apparatus claims.

The invention will now be described with reference to a number of exemplifying embodiments thereof and with reference to the accompanying drawings.

Figure 1:
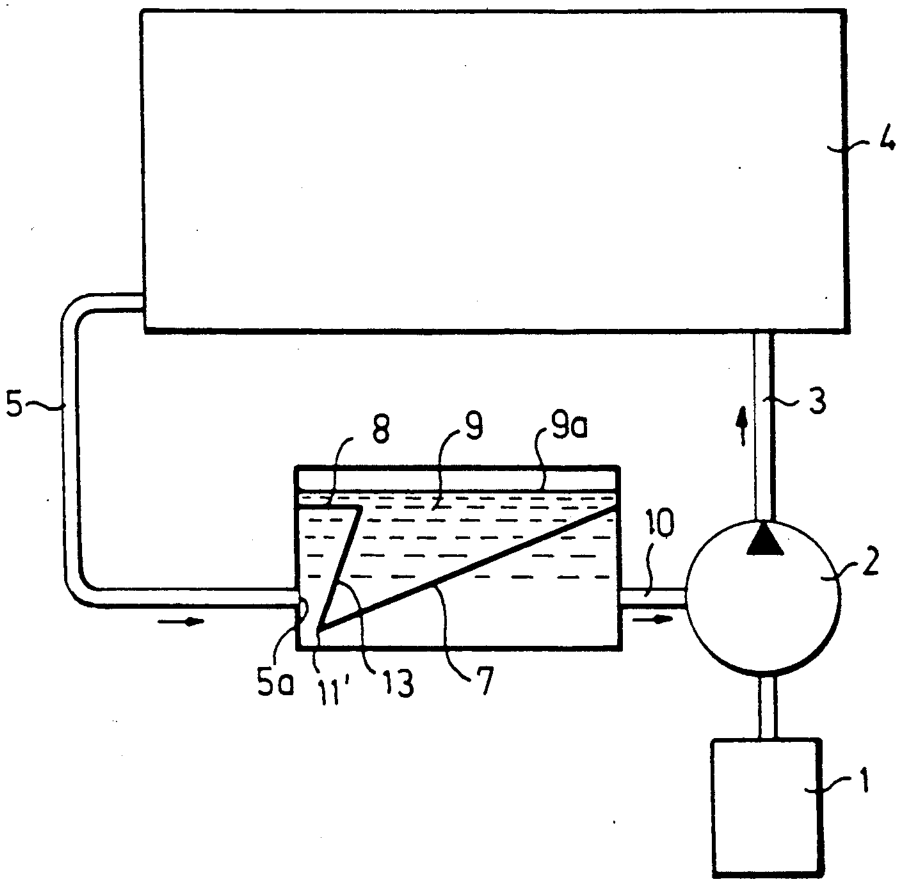
FIG. 1 illustrates schematically a mobile hydraulic system together with its essential components.

The hydraulic system illustrated in FIG. 1 in intended to serve mobile hydraulics in open-air locations, where cold starts may prove problematic. The system comprises a pump 2 which is driven by a motor 1 and which is operative in delivering fluid, oil, under pressure to apparatus 4, not shown in detail, through a pipe 3.

The return pipe or line of the hydraulic system is reference 5 and is connected to a reservoir 6, in which there is arranged a fine-mesh net structure 7, intended for extracting air from the fluid, and a diffusor 8. The net structure 7 and the diffusor 8 are positioned so as to lie beneath the level 9*a* of the oil in the reservoir.

Figure 2:
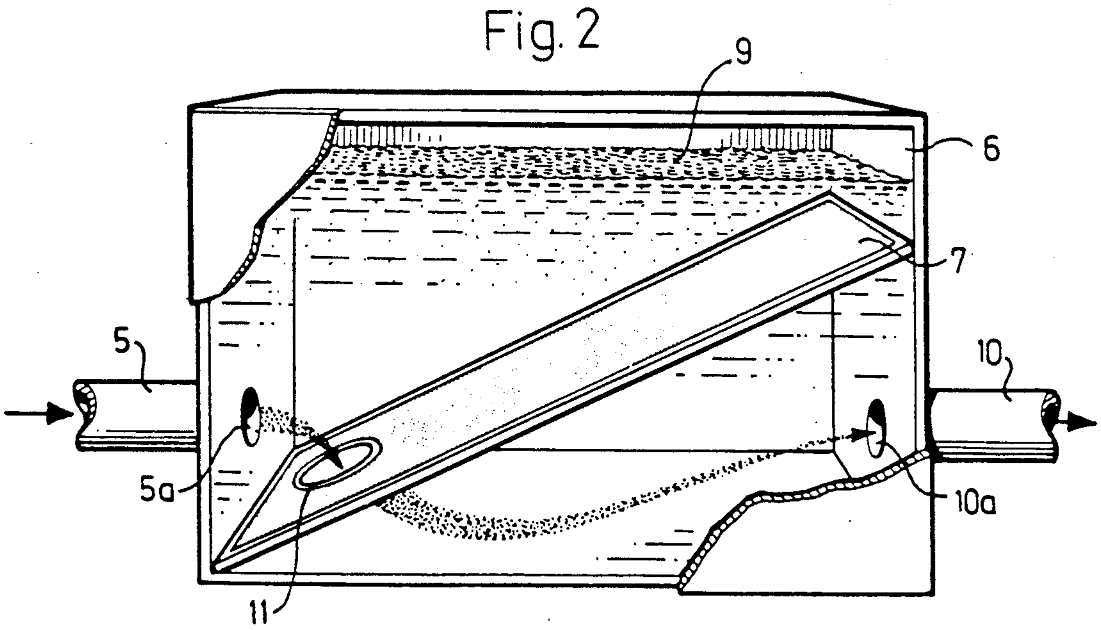
FIG. 2 is a perspective view of one embodiment of a reservoir for the hydraulic system illustrated in FIG. 1, the Figure also showing the pattern of fluid flow occurring when the system is started-up under cold conditions, i.e. when the fluid is cold.

FIG. 2 illustrates, in greater detail, a first embodiment of the reservoir 6 which lacks the provision of a diffusor. The reservoir has an inlet 5*a* and an outlet 10*a*, between which there is arranged a fine-mesh air-separating net structure 7.

When the system is started-up under cold conditions, when the oil 9 has a high viscosity, the pressure drop across the net will be excessively high. In order to avoid the disadvantageous consequencies of such a high pressure drop, a sharp-edged hole 11 is provided in the net structure 7. The hole functions to define a constricted passageway means and engenders viscosity-dependent shunting of the fluid. When the apparatus 4 is started-up, the major part of the fluid will pass through the hole 11, therewith lowering the pressure drop across the net structure 7.

Figure 3:
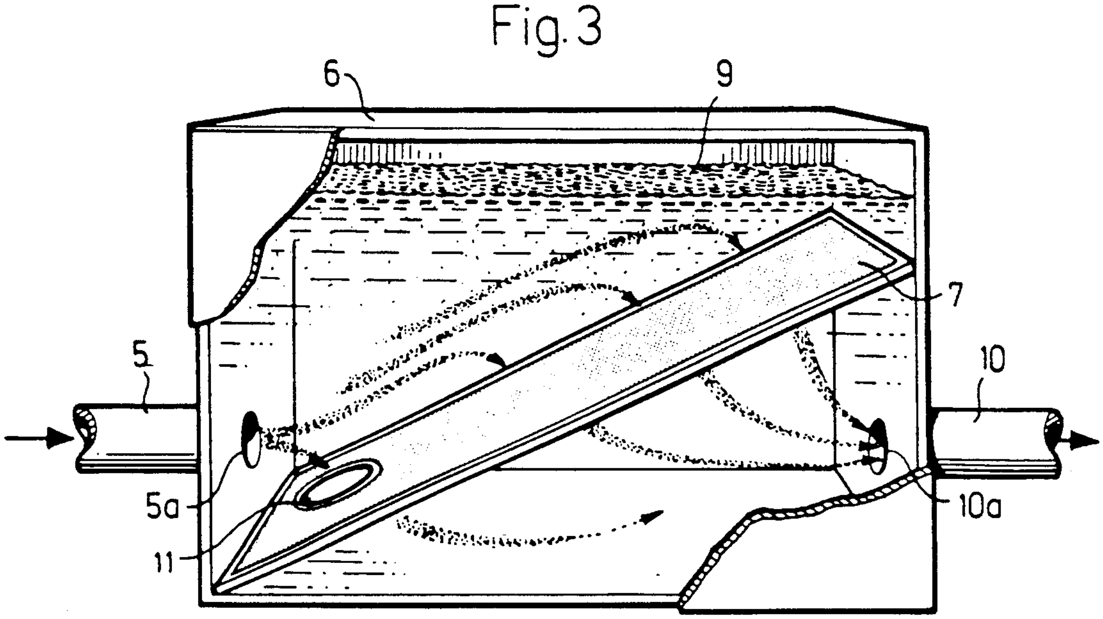
FIG. 3 corresponds to FIG. 2 and illustrates the flow pattern occurring when the fluid is warm.

FIG. 3 illustrates the course taken by said fluid flow after the system has been in operation for some time and the fluid, oil, has become warn and its viscosity has decreased. The fluid flow is now more uniformly divided and the fluid will flow through both the hole 11 and the net 7.

Figure 4:
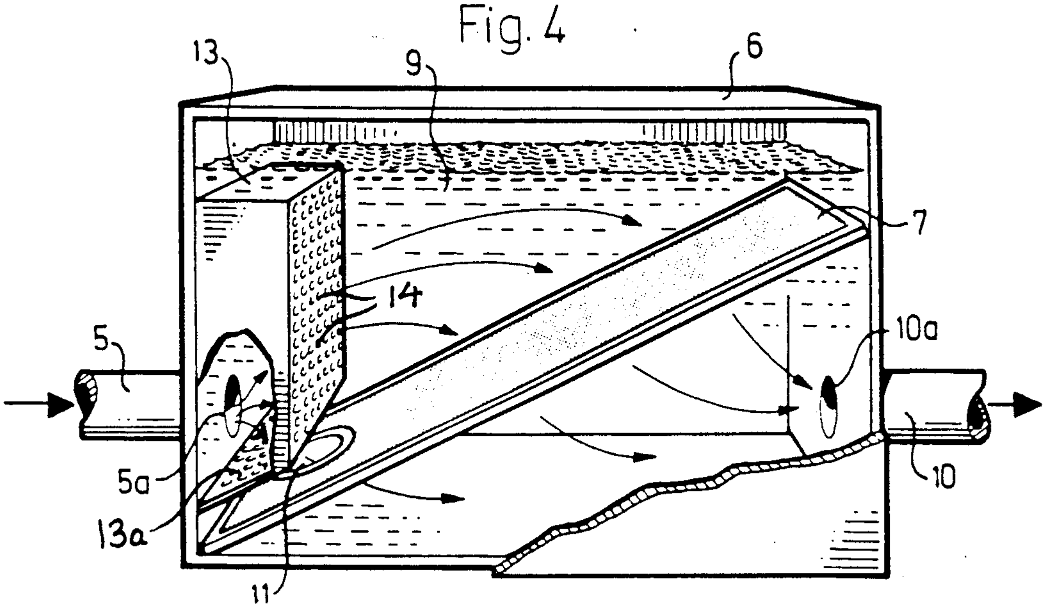
FIG. 4 illustrates an alternative reservoir arrangement which includes a diffusor.

FIG. 4 illustrates an embodiment in which a diffusor 13 is positioned above the inlet 5*a*, to ensure laminar flow of the fluid in the reservoir 6.

The diffusor 13 has perforations 14 and includes a downwardly sloping surface 13*a* located immediately above the hole 11 in the net structure 7. As with the embodiment aforedescribed, the major part of the fluid in this case will also flow through the hole 11 in the net 7, when the system is started-up under cold conditions.

In order to facilitate such flow, the diffusor 13 may also be provided with a corresponding hole 11 which serves as a flow constriction passageway. In this case, the two holes 11 are preferably positioned so that the flow path therebetween will be the shortest possible.

Figure 5:
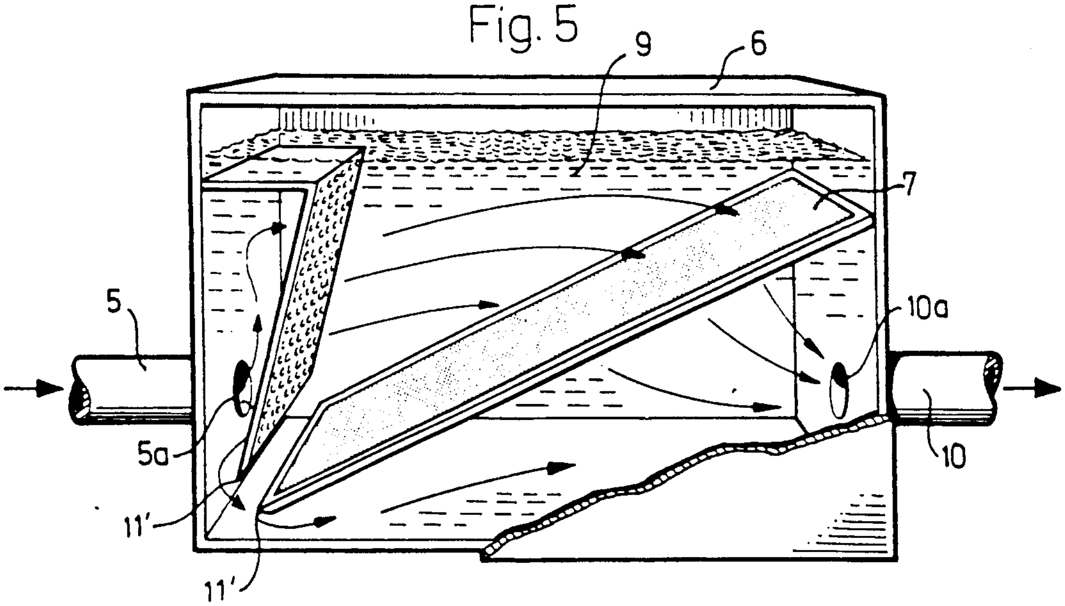
FIGS. 5–7 are perspective views of various alternative constricted passageway arrangements in an inventive reservoir.

FIG. 5 illustrates an embodiment in which a constricted passageway, in the form of a sharp-edged hole or aperture 11' is instead formed in an edge region of the net structure 7 and the diffusor 13 respectively. In the case of the FIG. 5 embodiment, the two constricted passageways 11 are located at respective lower edges of the diffusor 13 and the net structure 7, and are consequently spaced only a short distance apart.

Figure 6:
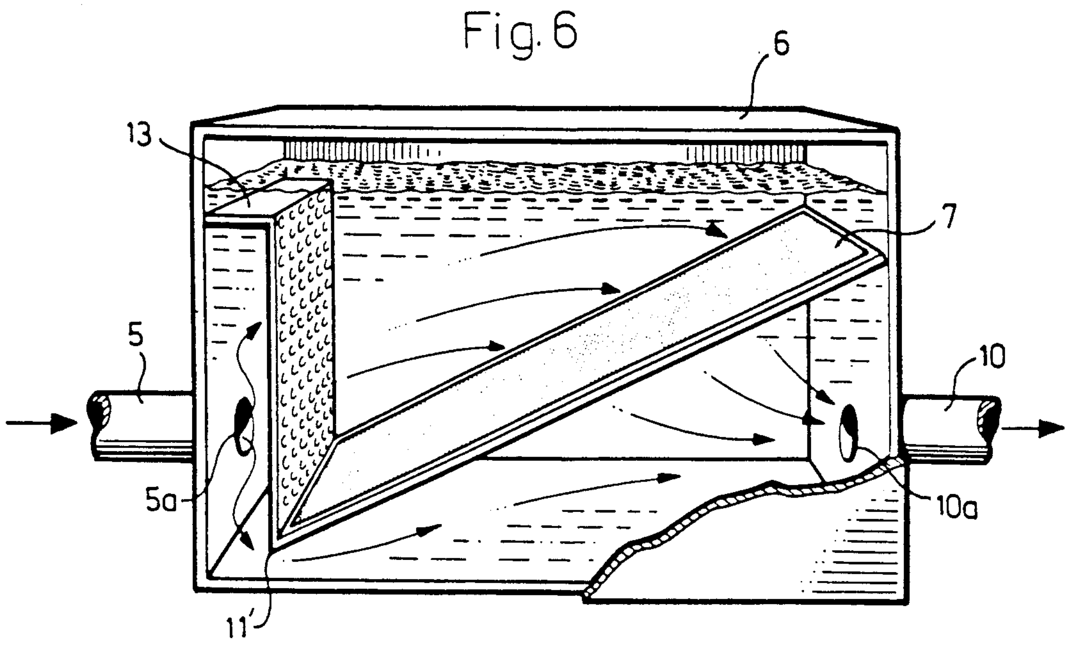

FIG. 6 illustrates an embodiment in which the net structure and the diffusor have mutually contacting, sharp lower edged which form a constricted passageway 11', said means extending across the whole width of the reservoir.

Figure 7:
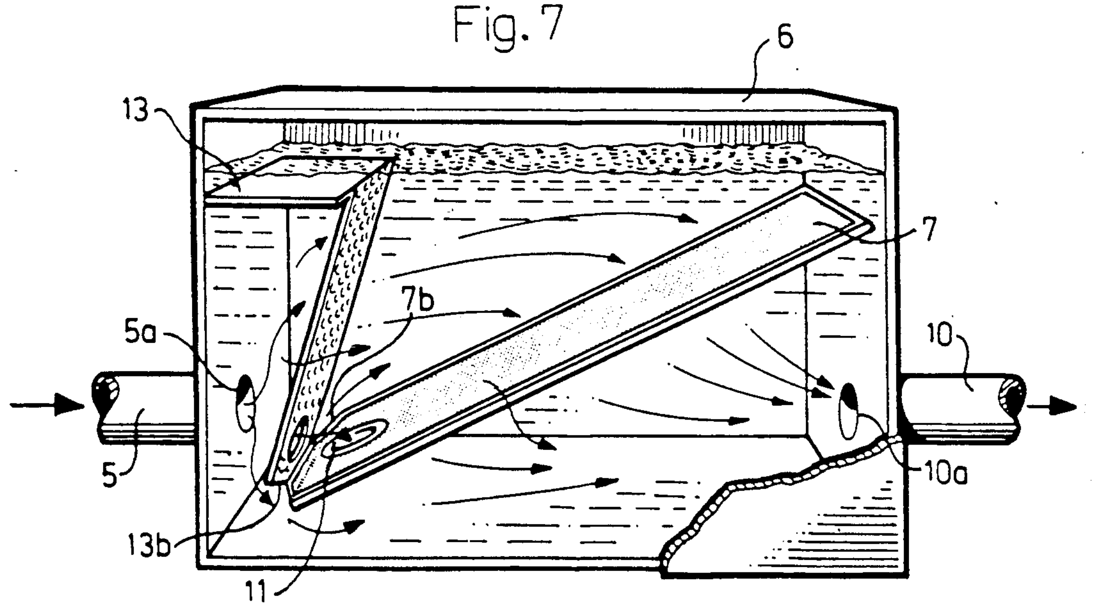

FIG. 7 illustrates an embodiment which corresponds essentially to the embodiment illustrated in FIG. 6, but in which both the diffusor 13 and the net structure 7 have inwardly cut recessed portions 13*b* and 7*b*, these inwardly cut recesses also serving to define further constricted passageways for viscosity-dependent shunting of the fluid under cold-start conditions.

It will be seen from the aforegoing that the fundamental inventive concept presented in the introduction can be manifested in many different forms. Although the effectiveness of the described embodiments may be expected to vary, all the embodiments will nevertheless fulfill the purpose intended.

Other embodiments are conceivable within the scope of the basic inventive concept. For instance, several constriction defining means may be provided in or adjacent to the net structure, instead of one single constriction defining means, or constricted passageway. Furthermore, the diffusor can be given a configuration different to that described and illustrated.

I claim:

1. A method of reducing pressure drop across a fine-mesh net structure during the passage of a fluid through said net structure, for the purpose of extracting air or gas from the fluid, characterised by conducting part of the fluid flow through a constricted passageway located in or adjacent to the net structure, so as to effect viscosity-dependent shunting of the fluid.

2. A method according to claim 1, characterised by conducting said part of said fluid flow through a sharp-edged hole in the net structure.

3. A method according to claim or claim 2, characterised by conducting said part of said fluid flow through a constricted passageway located in an edge region of the net structure.

4. A method according to claim 1, characterised by also causing the fluid to flow through a diffusor having the form of a perforated plate and being effective in imparting laminar flow to the fluid upstream of the net passageway.

5. A method according to claim 4, in which the constriction has a larger area than the area of the perforations, characterised by positioning the constricted passageway in a manner to achieve the shortest possible flow distance between said passageway and said diffusor.

6. A method according to claim 1, applied to starting-up mobile hydraulic systems, wherein the fluid is repeatedly passed through the net structure.

7. A reservoir (6) for use in fluid-circulating hydraulic systems and provided with air separator means, said means including a fine-mesh net structure (7) which is located in the path of fluid flow and which slopes in relation to the surface of the fluid in said reservoir, said reservoir having a fluid inlet (5*a*) and a fluid outlet (10*a*), characterised by a constricted flow passageway (11, 11') located in or adjacent to the net structure, for viscosity-dependent shunting of the fluid (9).

8. A reservoir according to claim 7, characterised in that the passageway includes a sharp-edged aperture (11, 11') provided in the net structure or in an edge region thereof.

9. A reservoir according to claim 7 or claim 8, characterised in that the reservoir has arranged therein a diffusor (13) which includes a perforated plate which is effective in imparting laminar flow to the fluid upstream of the net passageway.

10. A reservoir according to claim 9, characterised in that the constricted passageway and/or a further constricted passageway is provided in the diffusor or in an edge region thereof.

11. A reservoir according to claim 10 with a passageway in or adjacent to the diffusor (13) and a passageway in or adjacent to the net structure (7), characterised in that the passageways (11, 11') are located such as to present a short flow path therebetween.

12. A reservoir according to claim 9, characterised in that at least the major part of the net structure (7) and the diffusor (13) are located beneath the surface of the fluid in the reservoir.

* * * * *